(No Model.)
A. PONTEN.
CENTRIFUGAL BUTTER EXTRACTOR.
No. 521,043. Patented June 5, 1894.
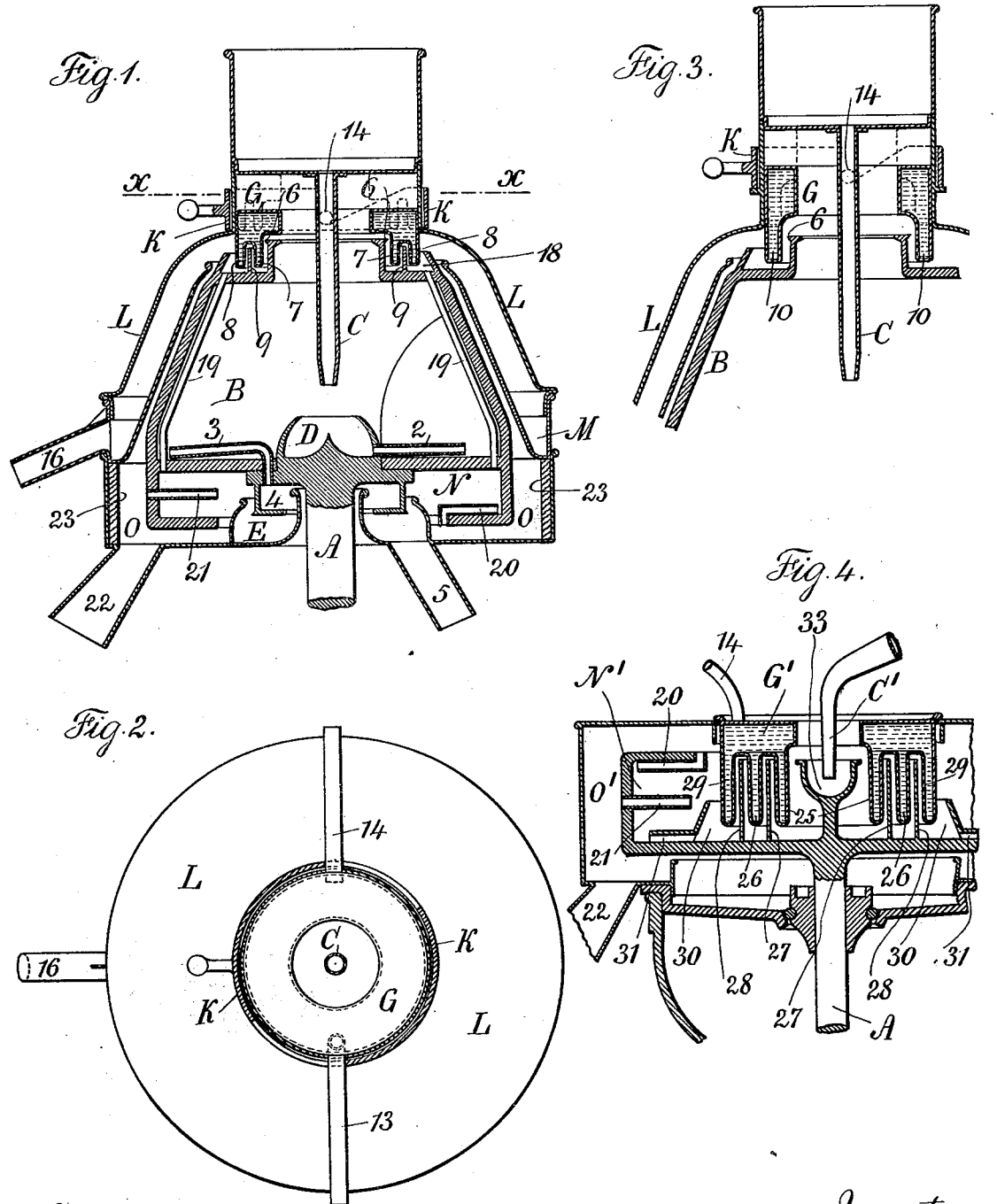

UNITED STATES PATENT OFFICE.

ANDERS PONTEN, OF NEW YORK, N. Y.

CENTRIFUGAL BUTTER-EXTRACTOR.

SPECIFICATION forming part of Letters Patent No. 521,043, dated June 5, 1894.

Application filed September 22, 1893. Serial No. 486,203. (No model.)

*To all whom it may concern:*

Be it known that I, ANDERS PONTEN, a subject of the King of Sweden and Norway, residing in the city and State of New York, have invented an Improvement in Centrifugal Butter-Making Apparatus, of which the following is a specification.

I have discovered that when cream is caused to pass centrifugally against a surface that is maintained at a sufficiently low temperature to chill the butter and buttermilk, the separation of the butter globules from the watery portions is effected by the concussion of the cream upon the chilled surface. I avail of this discovery in the easy and rapid treatment of cream for the separation of the buttery from the watery portions. With this object in view I provide a stationary cooler that is kept at a sufficiently reduced temperature by the flow of a cooling liquid through the same, and upon this cooler the cream is caused to impinge as delivered from the centrifugal separator, and I provide one, two or more surfaces for the centrifugal impingement, and I also arrange the cooler in such a manner that it may be lifted out of the way and cause the butter making operation to cease and the cream only to be delivered.

In the drawings, Figure 1 is a vertical section of my improvement. Fig. 2 is a sectional plan at the line x x. Fig. 3 is a diagram illustrating the apparatus with but one cooling surface. Fig. 4 is a diagram illustrating a modification with the butter making apparatus adapted to act upon cream that has been separated from the skim milk.

The spindle A is adapted to the reception of the centrifugal separating bowl B of any desired shape or character, and at C is a supply pipe for the milk, and the cup D is provided at the bottom of the bowl B for the milk to pass into and to be discharged by a pipe 2 past the cream wall of the separator and into the liquid contents of the separator, as heretofore usual, and the skim milk pipe 3 passes from near the interior of the bowl B to the place of delivery which is preferably downwardly so that the skim milk passes into the annular chamber 4 and from the edge thereof into the annular skim milk receiver E, from which such skim milk is discharged by a spout 5. The cream passes over the edge 6, preferably at the upper end of the centrifugal separator and is received against the surface of the cooler G, which cooler has one or more downwardly projecting hollow rings for the cream to strike against. In Fig. 1 I have shown two of such hollow rings 7 and 8 with an intermediate cylindrical flange 9 upon the top part of the bowl B; there however may be only one downwardly projecting hollow ring upon the cooler, as shown at 10, Fig. 3, or the number may be increased.

The cooler G is preferably made of sheet metal, and water or other fluid is caused to circulate through the same by the pipes 13 and 14. It is advantageous to make use of either water or brine as the circulating medium, the same passing through any suitable refrigerating apparatus by which the temperature is properly reduced before being passed through the cooler, and the cooler should be water-tight so that the liquid can be caused to flow through the same at any desired pressure; and I support this cooler in any suitable manner, preferably by a ring K resting upon the cover L, and such ring is notched at opposite sides where the pipes 13 and 14 pass in, the notches being inclined so that by a partial rotation of the ring K the vessel G may be raised up into the position indicated by dotted lines or lowered into the position shown by full lines.

When the cooler G is raised, its bottom edge is above the cream delivery lip 6, hence the cream is discharged without coming in contact with the cooler and passes against the cover L and thence flows down into the annular cream receiver M and is discharged by the pipe 16 and the butter making operation is suspended, but when the cooler G is lowered into the position shown by full lines, the cream as it is delivered from the annular lip 6 strikes against the interior stationary surface of the cooler and the cream and partially separated butter granules flow down the same and drop from the lower edge of the hollow annular portion 7 or 10 upon the top surface of the centrifugal vessel B, and where there is the annular flange 9 the cream and butter granules pass along the surface of that annular flange and are delivered from the upper end against the interior surface of the cooler and run down the annular hollow portion 8 and drop from the lower edge thereof upon the top surface of the cream separator B, and this operation is repeated where there are more than two annular hollow portions at the bottom of the cooler G; and the buttery and watery materials are received into the annular cup 18 around the upper part of the separator B and pass by one or more pipes 19 into the annular butter chamber N below the centrifugal separator B, where the buttery particles coalesce and this butter chamber N is provided with one or more pipes 20 for the watery portions to pass off and one or more pipes 21 for the buttery globules to pass off, and these materials are received into the annular vessel O that surrounds the lower part of the centrifugal separator, and from thence run by the pipe or spout 22; and it is advantageous to provide a wooden lining 23 to the annular vessel O for the buttery particles to strike against as delivered through the pipe 21.

It is now to be understood that the impingement of the cream from the annular lip 6 upon the surface of the cooler G produces a sudden chill to the cream in addition to the concussion resulting from the arresting of the cream as thrown off centrifugally, and the concussion and the cold act jointly to cause the separation of the buttery portions from the watery portions, the buttery portions coalescing to a greater or less extent upon the surface of the cooler in consequence of the rapid discharge of the cream in a condition approximating spray from the lip 6 of the centrifugal cream separator, and this operation is repeated according to the number of annular flanges 9 upon the top of the centrifugal separator, and by regulating the temperature of the cooling liquid according to the condition of the milk and according to the condition of the weather, so the butter making operation will be more or less rapid, and by the time the buttery and watery particles are received into the annular cup 18 and pass from the same through the pipes 19 into the annular butter chamber N, the buttery and watery particles will be in such a condition as to cause the buttery portions to coalesce to the required extent under the centrifugal action and within the annular butter chamber N, so that such materials can be delivered progressively into the annular vessel O and thence pass by the spout 22 into a suitable receiving vessel from which the buttery portions are dipped or discharged through a suitable strainer so as to allow the watery portions to run away from the buttery portions, and the butter is to be worked for the separation of the watery portions in any usual manner.

The wooden lining 23 to the annular vessel O is advantageous because the watery portions are absorbed by the same to a sufficient extent to prevent the buttery portions adhering thereto as thrown off centrifugally.

It is to be understood that when the cooler G is raised as before described the cream is delivered from the annular lip 6 directly into the cream receiver M and cover L and the butter making portions of the apparatus are thereby thrown out of use, so that this apparatus is available interchangeably for the separation of cream or for the production of butter.

The device shown in Fig. 4 is adapted to act upon cream that has been separated from the skim milk. This cream is supplied by the pipe C' into the bowl 33 and it is spread evenly and discharged from the rim of such bowl against the inner surface 25 of the cooler, and thence runs into the bowl and passes from the upper edge of the flange 27 against the next annular flange 26 of the cooler and runs back into the vessel and over the annular flange 28 and against the third annular flange 29 of the cooler and passes into the annular channel 30 for the butter, from which the butter is passed through one or more pipes 31 directly into the annular butter separating chamber N' that is provided with the pipe 21 for the discharge of the butter and the pipe 20 for the discharge of the watery portions, the same as in the annular butter chamber N, such material being received into the vessel O'.

The form of apparatus shown in Fig. 4 is only adapted to the continuous separation of butter especially from previously separated cream; and I remark that either apparatus might receive cream direct, either alone or diluted with water, instead of being supplied with fresh milk, and the device for supplying either cream or milk to the pipe C may be of any ordinary or desired character.

I claim as my invention—

1. In a centrifugal butter extractor a centrifugal cream separating vessel mounted upon a vertical axis in combination with a stationary cooler having one or more annular surfaces concentric with the axis of the centrifugal separator and surrounding the cream discharge thereof and against which the cream is discharged centrifugally from the separator, and means for cooling the annular surface, substantially as set forth.

2. The combination in a centrifugal butter extractor of a cream separator and a cooler having one or more annular surfaces concentric with the axis of the centrifugal separator and surrounding the cream discharge thereof, pipes through which the cooling fluid is caused to flow into and through the cooler, and means for moving the cooler into and out of action, substantially as set forth.

3. The combination in a centrifugal butter extractor, of a cream separating vessel having an annular discharge, a cooler against which the cream is received, an annular cup for the liquid dropping from the cooler, an annular chamber for the coalescing of the butter globules and a passage or pipe from the annular cup into such annular butter separating chamber, substantially as set forth.

4. The combination in a centrifugal butter extractor, of a cream separating vessel having an annular discharge, a cooler against which the cream is received, an annular cup for the liquid dropping from the cooler, an annular chamber for the coalescing of the butter globules and a passage or pipe from the annular cup into such annular butter separating chamber, and an annular receiving vessel around the butter separating chamber, substantially as set forth.

5. The combination in a centrifugal butter extractor of a cream separator, a cooler against which the cream is discharged from the centrifugal separator, an annular chamber for the coalescing of the butter globules connected to and revolving with the cream separator, a pipe leading the butter globules to the annular chamber, an annular receiver for the skim milk below and connected with the cream separator, and an annular vessel surrounding the same for the reception of the skim milk, and a discharge spout for the same, substantially as set forth.

6. The combination in a centrifugal butter extractor with a centrifugal cream separator, of an annular cooler upon the surface of which the cream is discharged when the cooler is lowered, means for raising the cooler, a cover and an annular cream receiver surrounding the centrifugal separator and into which the cream is discharged when the cooler is raised, substantially as set forth.

Signed by me this 6th day of July, 1893.

AND. PONTEN.

Witnesses:
GEO. T. PINCKNEY,
A. M. OLIVER.